(12) United States Patent
Demaya et al.

(10) Patent No.: US 8,224,511 B2
(45) Date of Patent: Jul. 17, 2012

(54) VEHICLE REGULATED-CONTROL DEVICE WITH TRIMMED PRECISION

(75) Inventors: Bernard Demaya, Vincennes (FR); Jerome Foreau, Versailles (FR)

(73) Assignee: Alstom Transport SA, Levallois-Perret (FR)

( * ) Notice: Subject to any disclaimer, the term of this patent is extended or adjusted under 35 U.S.C. 154(b) by 1035 days.

(21) Appl. No.: 11/895,140

(22) Filed: Aug. 23, 2007

(65) Prior Publication Data

US 2008/0051969 A1    Feb. 28, 2008

(30) Foreign Application Priority Data

Aug. 25, 2006  (FR) ...................................... 06 07537

(51) Int. Cl.
*G05D 1/00*   (2006.01)
(52) U.S. Cl. ................. 701/20; 701/70; 246/182 R
(58) Field of Classification Search .................... 701/19, 701/20, 70, 79; 246/182 R
See application file for complete search history.

(56) References Cited

U.S. PATENT DOCUMENTS

| | | | | |
|---|---|---|---|---|
| 3,562,515 A * | 2/1971 | Oster | ......................... | 246/182 B |
| 3,655,962 A * | 4/1972 | Koch | ......................... | 246/182 C |
| 3,808,426 A | 4/1974 | Michael S. Birkin | | |
| 3,906,315 A * | 9/1975 | Gotisar | ......................... | 318/761 |
| 3,921,946 A * | 11/1975 | Norton et al. | ............. | 246/182 A |
| 3,953,714 A * | 4/1976 | Gabillard | ......................... | 701/117 |
| 4,005,837 A * | 2/1977 | Grundy | ......................... | 246/182 B |
| 4,005,838 A * | 2/1977 | Grundy | ......................... | 246/182 B |
| 4,066,230 A * | 1/1978 | Nohmi et al. | ............. | 246/182 B |
| 4,093,162 A * | 6/1978 | Takaoka et al. | ................. | 701/20 |
| 4,208,717 A * | 6/1980 | Rush | ......................... | 701/20 |
| 4,270,716 A * | 6/1981 | Anderson | ................. | 246/182 B |
| 4,384,695 A * | 5/1983 | Nohmi et al. | ............. | 246/182 B |
| 4,852,007 A * | 7/1989 | Yasunobu et al. | ............. | 701/70 |
| 5,018,689 A * | 5/1991 | Yasunobu et al. | ......... | 246/182 B |
| 5,436,631 A * | 7/1995 | Magori et al. | ................. | 342/42 |
| 5,583,769 A | 12/1996 | Saitoh | | |
| 5,613,654 A * | 3/1997 | Gellermann et al. | ...... | 246/182 B |
| 5,696,682 A * | 12/1997 | Benoliel et al. | ................. | 701/70 |
| 5,947,423 A * | 9/1999 | Clifton et al. | ................. | 246/62 |
| 5,948,035 A * | 9/1999 | Tomita | ......................... | 701/70 |
| 6,067,496 A * | 5/2000 | Benoliel et al. | ................. | 701/93 |
| 7,408,314 B2 * | 8/2008 | Hayashi | ................. | 318/568.12 |
| 7,529,604 B2 * | 5/2009 | Moriguchi | ......................... | 701/23 |
| 2005/0203699 A1 * | 9/2005 | Moriguchi | ................. | 701/200 |
| 2010/0118988 A1 * | 5/2010 | Smith, Jr. et al. | ............. | 375/259 |

FOREIGN PATENT DOCUMENTS

| | | |
|---|---|---|
| EP | 0 375 553 A1 | 6/1990 |
| EP | 0 709 272 A1 | 5/1996 |
| EP | 1 577 188 A2 | 9/2005 |

* cited by examiner

*Primary Examiner* — Helal A Algahaim
(74) *Attorney, Agent, or Firm* — Davidson, Davidson & Kappel, LLC

(57) ABSTRACT

The regulated-control device (10) for precision-stopping of a vehicle (4) with automatic control comprises: an observed kinematic input (44, 46) capable of receiving at least an observed kinematic variable for the vehicle (4), a predetermined setpoint input (42), capable of receiving an unregulated-control setpoint signal, a regulated-control output (40), which is dependent on the observed kinematic input (44, 46) and the setpoint input (42), according to a predetermined characteristic transfer function comprising at least an internal parameter (K, τ).

25 Claims, 7 Drawing Sheets

VEHICLE REGULATED-CONTROL DEVICE WITH TRIMMED PRECISION

TECHNICAL FIELD

The present invention relates to a precision-stopping control device for a train with fully automatic control.

BACKGROUND TO THE INVENTION

It is well known that trains, particularly underground trains, are equipped with automatic control systems for the safe driving of vehicles between stations and precise stopping of the train at each station.

When station platforms are provided with screen doors, the doors of the train must be aligned with the platform doors as otherwise the operation of automatic trains, particularly driverless underground trains, is disrupted.

If the adjustment of braking of the train is too harsh, the train over-brakes, causing the centre of the train doors to be offset upstream of the corresponding screen doors.

If, on the other hand, adjustment of the braking of the train is too soft, the train under-brakes, causing the centre of the train doors to be offset downstream of the corresponding screen doors.

The adjustment of a train control device must therefore allow these over-braking or under-braking characteristics to be overcome.

It is known that after the commissioning of a train of which the stopping control device has been set at the outset, the characteristics of the train vary during operation owing to wear or ageing.

The regulation used in this case is incapable of compensating for these changes, resulting in more frequent recourse to remote manual control of the train and wasted running time.

The objective technical problem is to reduce the period when trains are not available and the loss of traffic from the system during operation.

The object of the invention is therefore to improve train availability and traffic.

SUMMARY OF THE INVENTION

The invention accordingly relates to a regulated-control device for precision-stopping for a vehicle with automatic control comprising an observed kinematic input capable of receiving at least an observed kinematic variable from the vehicle, a predetermined setpoint input, capable of receiving an unregulated control setpoint signal, a regulated-control output capable of supplying at least a dynamic regulated control value to the vehicle, which is dependent on the observed kinematic input and the setpoint input according to a predetermined characteristic transfer function of the device, the transfer function comprising at least an internal parameter, wherein the device comprises an adaptation control unit capable of modifying at least an internal parameter by an adaptation control, the adaptation control being dependent on the observed kinematic input and the setpoint input.

According to particular embodiments, the control device comprises one or more of the following features taken in isolation or in any technically feasible combinations:
- the device comprises two modifiable internal parameters, the first parameter being a dynamic response delay associated with the vehicle and the second parameter being a dynamic regulation bias control;
- the adaptation control is dependent on the difference between, on the one hand, the observed kinematic input, and, on the other hand, an expected kinematic value, determined from a predetermined dynamic response model associated with the vehicle and from the setpoint input;
- the adaptation control also depends on at least a convergence parameter, which is dependent on a regulation control;
- the control function is divided into categories defined according to the difference between the observed kinematic input and the expected kinematic value, and the at least one convergence parameter;
- the setpoint input is a vehicle deceleration setpoint receiving input,
- the observed kinematic input comprises an observed velocity receiving input and an observed deceleration receiving input,
- the regulated-control output is an output supplying a regulated-control deceleration signal for the vehicle,
- and it comprises a set of component units of the device transfer function;
- the device comprises:
  - a modelling unit representing an expected dynamic response of the vehicle to the deceleration setpoint, allowing the expected deceleration of the vehicle to be determined as an expected kinematic value;
  - a unit for comparing the expected deceleration signal with the observed deceleration signal,
  - a regulation unit for providing a feedback control signal for correcting the difference between the expected deceleration and the observed deceleration,
  - a synthesis unit to determine a regulated-control signal as a function of the setpoint signal and the feedback correction signal;
- the adaptation control unit comprises:
  - a first adaptation control unit input for receiving the deceleration setpoint,
  - a second adaptation control input for receiving the observed deceleration,
  - a response time estimator by comparing the time variation curve of the expected deceleration with that of the observed deceleration,
  - at least a convergence parameter statistical estimator representing the stopping precision, which is dependent on the observed deceleration and the train deceleration setpoint;
- the regulation unit comprises:
  - a regulation unit input for receiving the difference between the expected deceleration and the observed deceleration,
  - an output supplying an integral-type regulation component known as an integral control,
  - and the adaptation unit comprises a third input connected to the integral control output of the regulation unit;
- an estimator of the adaptation unit is capable of determining a convergence criterion based on the integral regulation control signal supplied at the input;
- the adaptation control unit is capable of:
  - identifying, by a classification process, a vehicle braking category which is dependent, on the one hand, on the difference between an observed response time and a time predicted by the modelling unit of the effect of the setpoint sent to the vehicle and on the other hand on at least a convergence parameter,
  - allocating adaptation controls as a function of the braking category of the vehicle;
- the adaptation control unit comprises:

an input supplying an observed velocity of the train, a first statistical estimator of a first convergence parameter representing the stopping performance, which is dependent on the observed deceleration and the deceleration setpoint, a second statistical estimator of a second convergence parameter representing the stopping performance, which is dependent on the observed velocity, the observed deceleration and the deceleration setpoint;

the adaptation control unit comprises:

a first output capable of issuing a bias control for regulating the control, a second output capable of issuing a control for adjusting the dynamic response delay, the first output of the adaptation control unit is connected to the input of the regulation unit, and the second output of the adaptation control unit is connected to the input of the modelling unit to supply it with a delay adjustment control;

the device comprises:

a triggering/activation input for the stopping control device, and triggering/activation means for operating the stopping control device;

the triggering/activation device comprises:

a control input capable of receiving a release control input for the final precision-stopping mode, a switch with two inputs and one single output, the output being connected directly to the vehicle input, and the connection of an input to the output depends on the triggering/activation control signal supplied at the control input.

The invention also relates to a regulated-control process for precision vehicle stopping used by a regulated-control device defined by a transfer function having at least an internal parameter, comprising the stages consisting of:

receiving, at a setpoint input, a predetermined unregulated vehicle control setpoint, receiving, at an observed kinematic input, an observed kinematic value from the vehicle, supplying, at a regulated-control output, an adjusted control signal to the vehicle, wherein it also comprises a stage consisting of controlling the adaptation of at least an internal parameter as a function of the setpoint input and the observed kinematic input.

According to particular embodiments, the process comprises one or more of the following features taken in isolation or in any technically feasible combinations:

the process comprises the stages consisting of:

modelling and calculating a dynamic vehicle response to a vehicle control setpoint in the form of an expected kinematic value, comparing the expected kinematic value with the observed deceleration value, regulating the control setpoint by supplying a feedback signal to correct the difference between the expected kinematic value and the observed kinematic value, combining the setpoint and the feedback correction signal to determine a regulated control;

the adaptation control stage comprises the stages consisting of:

receiving the control setpoint at a first input, receiving the observed kinematic value at a second input, estimating the dynamic response time by comparing the time variation of the expected kinematic value with the observed kinematic value, estimating by a statistic a convergence parameter representing the stopping precision, as a function of the observed kinematic value and the control setpoint;

the adaptation control stage comprises the stage consisting of:

receiving an integral-type regulation component supplied at the regulation stage, and the estimation of a convergence criterion is based on the integral-type regulation component supplied;

the adaptation control stage also comprises the stages consisting of:

identifying by a classification process a train braking category which is dependent, on the one hand, on the difference between the observed response time and the predicted time of effect of the setpoint sent to the vehicle via the control device and on the other hand on at least a convergence parameter representing a stop, allocating adaptation controls as a function of the train braking category;

the adaptation control stage also comprises the stage consisting of:

receiving an observed velocity of the vehicle at one input, and the estimation stage comprises a first estimation stage consisting of determining, by an initial statistic, a first convergence parameter representing the adjustment performance, which is dependent on the observed deceleration of the train and the deceleration setpoint, a second stage for estimation by a second statistic of a second convergence parameter representing the adjustment performance, which is dependent on the observed velocity, the observed deceleration and the deceleration setpoint;

the adaptation control stage also comprises the stages consisting of:

issuing at an initial output a bias control for regulating the regulated control, issuing at a second output a delay adjustment control;

the delay adjustment control is supplied to the unit modelling the dynamic response of the vehicle;

the adaptation control stage also comprises the stage consisting of:

supplying an outside-limits train warning message if the convergence criteria fail to converge and/or there is failure of alignment of the response time the taking effect of the deceleration setpoint after a predetermined number of stops; and the process also comprises a stage consisting of:

triggering/activating the regulated-control device.

The invention also relates to a train comprising the device according to the invention to control the action of the engine and/or the brake.

BRIEF DESCRIPTION OF THE DRAWINGS

The invention will be understood better on reading the description that follows of an embodiment given as an example and with reference to the drawings in which.

DESCRIPTION OF PREFERRED EMBODIMENTS

Figure 1:
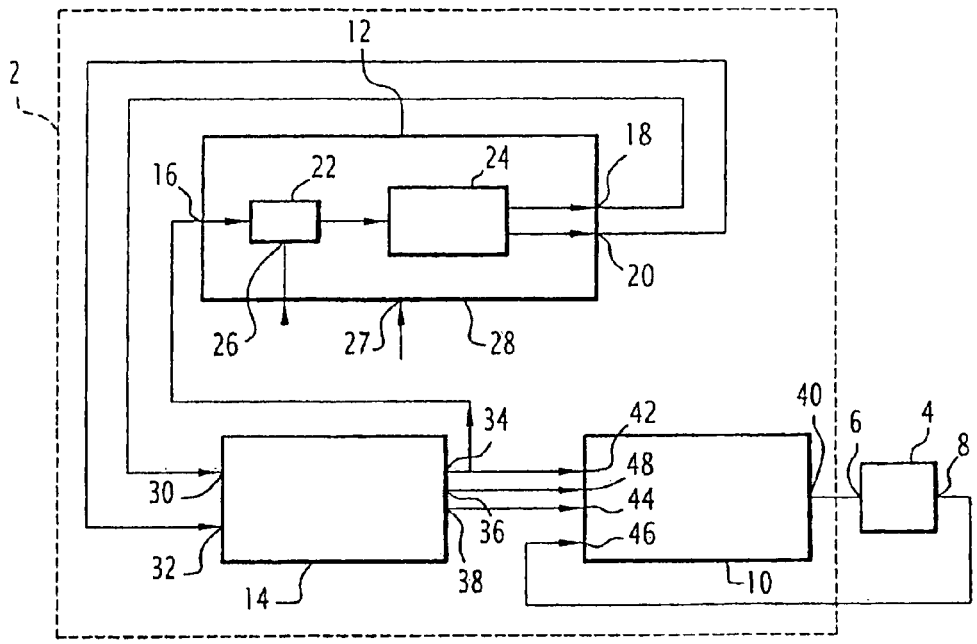
FIG. 1 is a block diagram of a train automatic control device according to the invention.

FIG. 1 illustrates an automatic control device 2 for a train 4 operating without driver-supplied controls.

The train 4 comprises a set of carriages with traction engines and brakes for braking and stopping the train. In a variant, the train may be any automatic vehicle.

The train 4 is capable of receiving, at a control input 6, a regulated acceleration/deceleration control and supplying, at an observation output 8, the acceleration/deceleration observed here in the form of an on-board train measurement.

The automatic control device 2 comprises a regulated-control device 10 for precision-stopping, a kinematic parameter estimator 12 for the train 4 and a central control unit 14 for the driverless train.

The kinematic parameter estimator 12 comprises a first estimator input 16 for receiving an acceleration/deceleration setpoint prepared by and coming from the central unit 14. The kinematic parameter estimator also comprises first and second estimator outputs 18, 20 capable of supplying respectively an estimated distance d from a locating marker on the ground and an estimated kinematic velocity v of the train.

The kinematic parameter estimator 12 comprises, upstream, a circuit 22 for delaying the effect of the setpoint and, downstream, a predictive/corrective kinematic integrator 24. The delay circuit 22 is capable of receiving the acceleration/deceleration setpoint from the input 16 and for receiving a delay adjustment control marked τ at a delay adjustment input 26. The kinematic parameter estimator 28 also comprises an initialisation input 27, for receiving kinematic processing initialisation parameters.

The central control unit 14 responsible for coordinating the tasks of the automatic control device 2 comprises a first input 30 and a second input 32 for receiving the estimated distance d and the estimated velocity v respectively from the kinematic parameter estimator 12. The central control unit 14 also comprises a first output 34 for the acceleration/deceleration setpoint signal, a second output 36 supplying the driving/braking mode selection signal and a third output 38 supplying the kinematic velocity v of the train.

The regulated-control device 10 comprises a regulated-control output 40, capable of delivering a regulated-control signal for the train and connected to the input 6 of the train 4.

The precision-stopping control device also comprises a first input 42 capable of receiving an acceleration/deceleration setpoint from the output 34 of the central unit, a second input 44 for receiving the signal estimating the velocity v from the output 38, a third input 46, capable of receiving the observed deceleration of the train, from the output 8 of the train 4 and a fourth input 48 for controlling the mode selection from the output 36 of the central unit.

Figure 2:
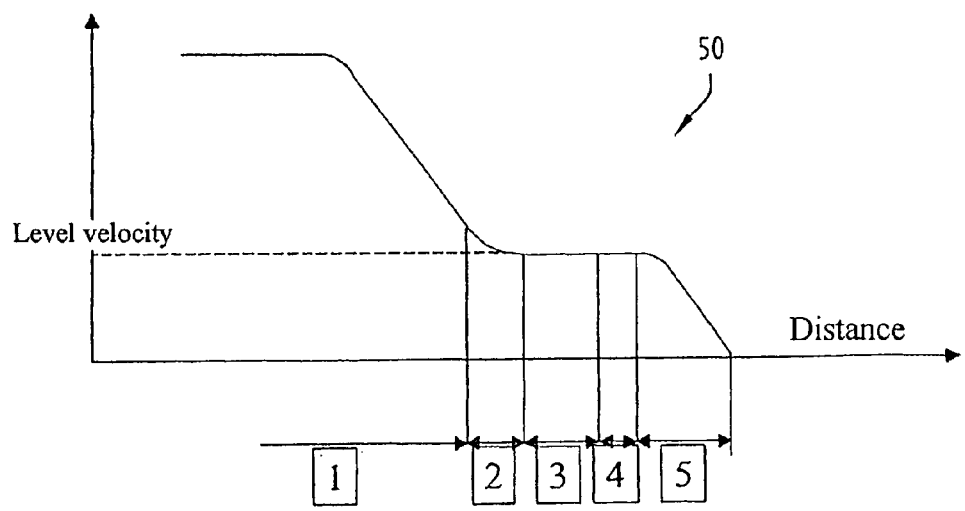
FIG. 2 is a graph of the velocity curve of a train as a function of distance, corresponding to a stopping strategy.

In operation, the automatic control device 2 allows a stopping strategy as illustrated in FIG. 2 to be carried out.

FIG. 2 shows the pace of the velocity of the train 50 as a function of the distance for the chosen stopping strategy.

Phase 1, designated by a numeral 1 enclosed in a square, shows a braking phase up to a distance close to the stopping point in the station following driving at a constant velocity.

Phase 2 allows the braking force to be cancelled to ensure passenger comfort by avoiding sudden final braking.

Phase 3 is a phase at constant velocity $v_{\phi 3}$, known as 'level velocity'. This velocity must be low enough to optimise comfort but not too low in order to prevent an under-braking train from stopping upstream of the station stopping point. The distance covered at low velocity should be as small as possible to ensure visual comfort as well as driving comfort.

Phase 4 is optional. It is used for trains where it is not possible to keep the pneumatic braking system under pressure by applying no braking force. When it is present, this is the phase where pneumatic braking is pressurised.

Finally, phase 5 known as the 'final precision phase' is the final braking phase. To ensure passenger comfort, final braking should not be too harsh. Braking must allow the train to be maintained in the stopped position.

During phases 1 to 4, the central control unit 14 selects a first control mode, known as driving mode, by sending a mode selection control from the output 36 to the precision-stopping control device 10. In driving mode, the stopping control device 10 is transparent and transmits the deceleration setpoint from the central control unit 14, and sends it in full to the train input. During the four phases 1 to 4, the effective control received by the train 4 is produced by the central control unit 14 alone and is equal to the control setpoint.

During phase 3, the central control unit 14 checks whether the final precision phase should be activated by comparing a threshold value with the stopping distance covered, calculated by the kinematic parameter estimator.

To determine the stopping distance covered, the kinematic parameter estimator 12 uses a train braking model in acceleration/deceleration and its derivative, also known as 'jerk'. The kinematic parameter estimator 12 integrates the acceleration/deceleration model twice, once to obtain the kinematic velocity v and a second time to obtain the distance d, the initial conditions having been adjusted at input 27 from a locating signal.

The predictive calculation is performed at each calculation cycle of the central unit 14 and the two integrations are performed from a digital integration method based on a corrective predictor 24.

Thus, when the calculated distance covered d is close to the station stopping point, phases 4 and 5 are activated by the central control unit 14.

Using this stopping distance calculation principle, the control unit overcomes the under-braking or over-braking behaviour of the train. Moreover, it is therefore possible to avoid the use of a dedicated braking activation marker situated at the station entrance for phases 4 and 5, and in addition, stopping precision is increased.

Figure 3:
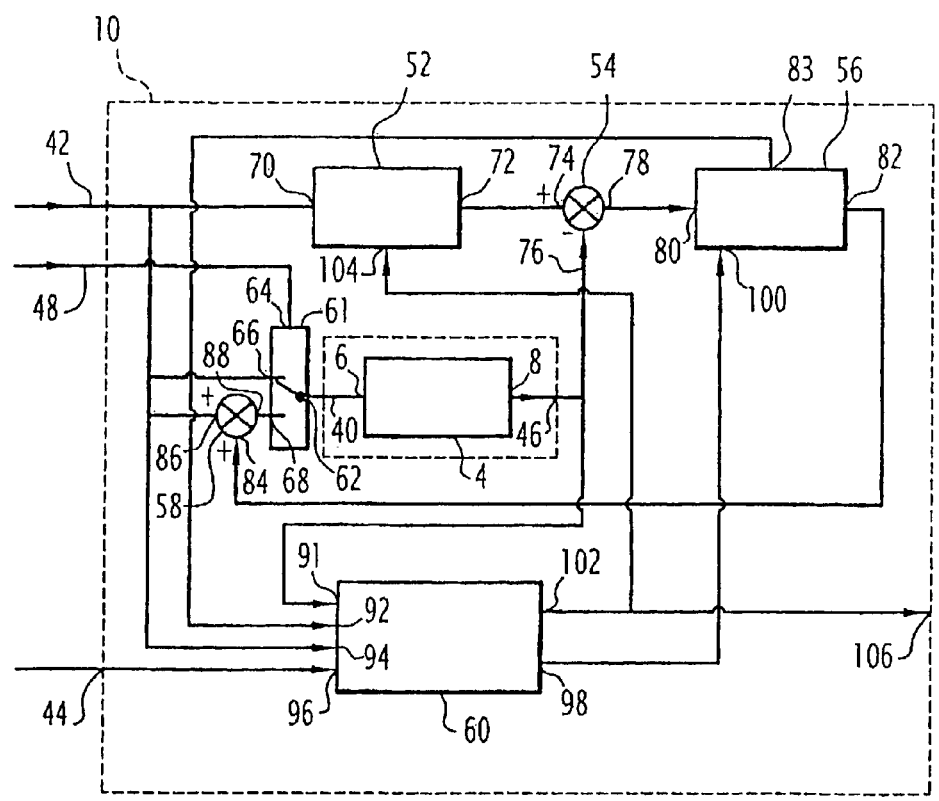
FIG. 3 is a block diagram of the regulated-control device for precision-stopping.
Figure 4:
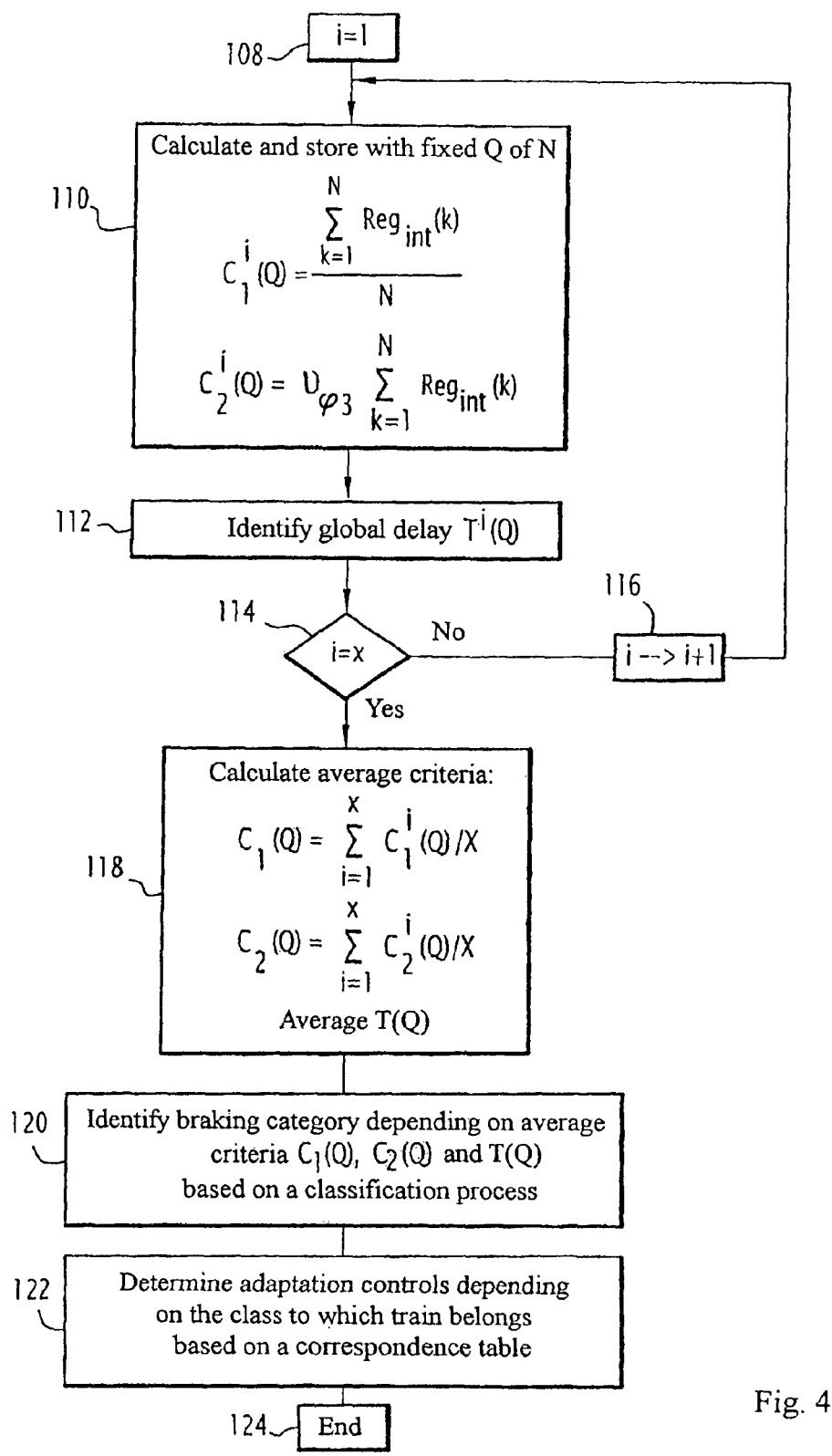
FIG. 4 is a flow chart of the adaptation controls production process.

FIG. 3 shows an embodiment of the regulated-control device 10.

The regulated-control device 10 comprises a modelling unit or model circuit 52 of the dynamic response of the train, a unit 54, here a comparator, for comparing the response of the model with the actual response of the train 4, a regulation unit 56 for supplying a global feedback correction control and a synthesis unit, here an adder 58, to determine a regulated train control signal which is dependent on the setpoint signal and the feedback correction signal.

The regulated-control device 10 also comprises an adaptation control unit 60 to adjust the characteristic control parameters of the precision-stopping performance of the train, and triggering/activation means for operating the stopping control device, here a mode switch 61.

For ease of illustration of the connections, the train 4 is shown in FIG. 3 inside a large square drawn as a dotted line delimiting the regulated-control device 10, but the train is not part of the regulated-control device 10. It is therefore delimited inside by a second smaller square in a broken line to separate it from the regulated-control device 10 which surrounds it.

The mode switch 61 is equipped with a single output 62 to supply the regulated-control signal at the input 6 of the train 4 via the output 40. The mode switch 61 also comprises a first control input 64 connected to 44, capable of receiving a mode control, a second driving mode input 66 connected to 42 to receive the acceleration/deceleration setpoint signal and a third input 68 capable of receiving a regulated-control stopping signal.

The model circuit 52 of the dynamic response of the train comprises a first input 70 to receive the deceleration setpoint signal of the train 4 and an output 72 to deliver the modelled dynamic deceleration response of the train 4. The output 72 of the model circuit 52 is connected to a first input 74 of the comparator 54 receiving the response from the model.

The comparator 54 also comprises a second input 76 connected to the input 48 to receive the observed deceleration of the train from the output 8 of the train 4.

Finally the comparator comprises an output 78 supplying an error signal connected to a first input 80 of the regulation unit 56.

The regulation unit 56 allows a correction or 'regulation' signal to be determined according to two components, the first known as the proportional component and the second known as the integral component.

The regulation unit 56 comprises a first output 82 to deliver the global correction signal and a second output 83 for delivering the integral control signal.

The adder 58 comprises a first input 84 connected to the first output 82 of the regulation unit 56 and a second input 86 connected to 42 for receiving the deceleration setpoint signal. The adder 58 also comprises an adder output 88 for delivering the result of adding the two signals supplied at inputs 84 and 86.

The adaptation control unit 60 comprises a first input 91 connected to 48 for receiving the acceleration/deceleration observation of the train from 8, a second input 92 connected to 83 capable of receiving the integral control of the regulation unit 56, a third input 94 connected to 42 capable of receiving the deceleration setpoint and a fourth input 96 connected to 44 for receiving the kinematic velocity information v of the train 4.

The adaptation control unit 60 also comprises a first output 98 capable of supplying a regulation control bias marked K to a second adaptation input 100 of the regulation unit 56.

The adaptation control unit 60 also comprises a second output 102 capable of supplying an adaptation control relating to the delay marked $\tau$ to a second adjustment input 104 of the model circuit 52 of the dynamic response of the train 4. In addition and optionally, the second output of the adaptation unit is connected to an auxiliary output 106 of the control device allowing the value $\tau$ of the delay adaptation control to be supplied to another circuit.

In operation during phases 4 and 5, the selection control signal is placed in a second mode known as the stop mode. Thus, the stop control device 10 is activated to control the precision-stopping in the final precision-stopping phase.

In operation, a process is carried out by the adaptation control unit 60, in which the categories to which the train belongs, characterised by its braking type, are determined. As a function of the category to which the train belongs, the adaptation control unit 60 supplies different controls, namely the regulation control bias K at 56 and the delay adaptation control $\tau$ at 52.

The process carried out by the adaptation control unit 60 is described in detail below.

In an initial stage 108, a stop counter i is initialised to the value 1. For each stop i of the train in question with a load inertia Q, assumed here to be almost constant and permanent, a criterion calculation stage 110 and a delay identification stage 112 are used.

In stage 110, a first criterion $C_1^i(Q)$ and a second criterion $C_2^i(Q)$ are calculated as follows.

$$C_1^i(Q) = \sum_{k=1}^{N} Reg_{int}(k)/N$$

$$C_2^i(Q) = v_{\varphi 3} \sum_{k=1}^{N} Reg_{int}(k)$$

where:

k is a sample number of a measurement sampling carried out during phases 4 and 5, N is the size of a statistic, $Reg_{int}(k)$ is the integral component of the control of the regulation unit 56 corresponding to the sampling of order k supplied at input 92, $V_{\varphi 3}$ is the value of the plateau velocity of the train during phase 3 supplied at input 96, It is assumed that the value of N is chosen so as to allow determination of convergent values of $C_1^i(Q)$ and $C_2^i(Q)$ as a function of the variable k.

In stage 112, the delay in the deceleration setpoint effectively taking effect is identified.

A test is carried out in stage 114 on the number of stops made by the train, accounted for by the value i of the stop counter by comparing i with a predetermined threshold value x. If the threshold value is not reached, the value i of the counter is incremented by one unit and stages 110, 112 are repeated.

When the threshold value x is reached by the counter, first and second average criteria $C_1^i(Q)$ and $C_2^i(Q)$ and an average delay T(Q) are calculated at stage 118 using the following algorithms:

$$C_1(Q) = \sum_{i=1}^{X} C_1^i(Q)/X$$

$$C_2(Q) = \sum_{i=1}^{X} C_2^i(Q)/X$$

$$T(Q) = \sum_{i=1}^{X} T^i(Q)/X$$

where:

represents a train stop order or test index x represents the size of a stop statistic, $C_1^i(Q)$ represents the value of the first criterion calculated at stage 110 for the stop of order i of the train in question, $C_2^i(Q)$ represents the value of the second criterion calculated at stage 110 for the stop of order i of the train in question, $T^i(Q)$ represents the value of delay in the setpoint identified during the test of order i of the train taking effect.

In a subsequent stage 120, based on a classification process, a braking category characteristic of the train braking type is identified and allocated to the train as a function of the average convergence criteria $C_1(Q)$, $C_2(Q)$ and the average delay $T(Q)$ assumed here to be independent of Q and marked $C_1$, $C_2$ and T for simplicity.

In a subsequent stage 122, the adaptation controls, which are dependent on the train-braking category, are determined on the basis of a control allocation process, which will be described below.

In the final stage 124, a check is made to ensure that the adjustment parameters have indeed been modified.

Figure 5:
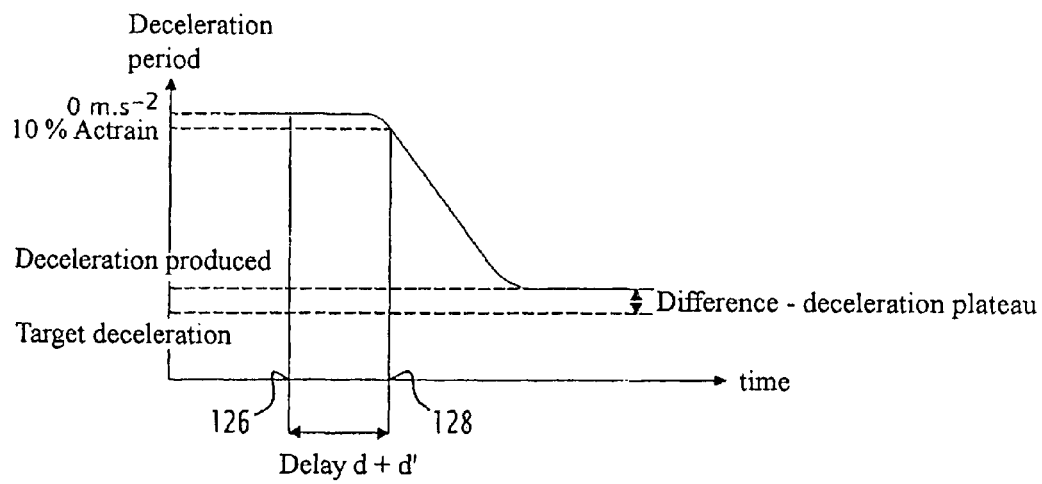
FIG. 5 is a graph of the curve identifying the delay in the deceleration setpoint taking effect associated with an under-braking train.
Figure 6:
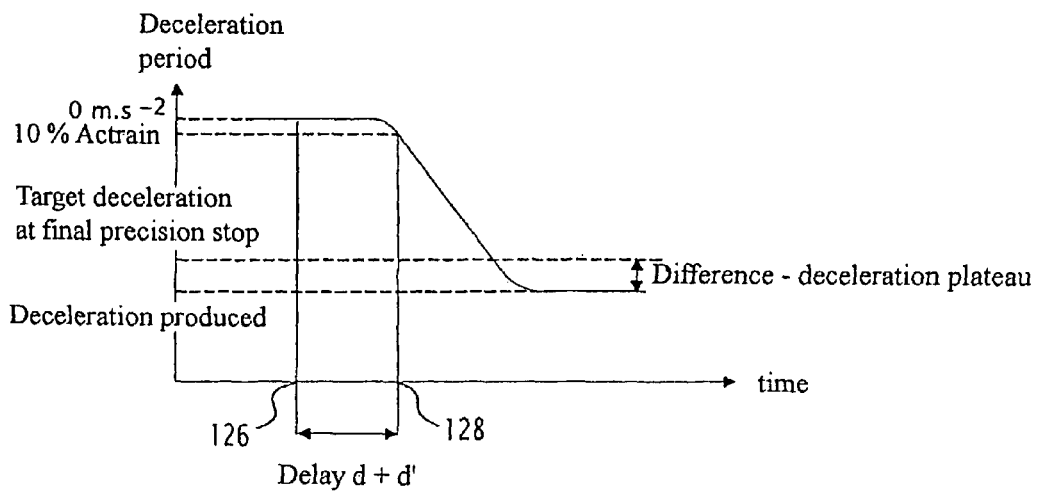
FIG. 6 is a graph of the curve identifying the delay in the deceleration setpoint taking effect associated with an over-braking train.

FIGS. 5 and 6 show graph curves for carrying out the process for identifying the delay $T^i(Q)$ in stage 112.

Here, the graph curves are recorded by the adaptation control unit 60 in the form of a succession of digital samples of the measured deceleration of the train 4 supplied at input 91.

The target deceleration indicated in FIGS. 5 and 6 is the final precision deceleration setpoint supplied by the central control unit 14 to the third input 94 of the adaptation control unit 60 before execution of the final precision-stop phase.

The final precision-stop phase 126 is activated when the target deceleration setpoint is received by the stopping device and therefore by the adaptation control unit as well.

The deceleration setpoint takes effect on the train at the instant 128 when a deceleration of 10% of the target value is observed over the observed deceleration value of the train supplied at input 91.

The time lag between instants 128 and 126 represents the delay $T^i(Q)$.

When the deceleration produced is lower in absolute value than the target deceleration of the train 4, the train is under braking as shown in FIG. 5.

When the stabilised deceleration produced is higher in absolute value than the target deceleration of the train 4, the train is over braking as shown in FIG. 6.

Figure 7:
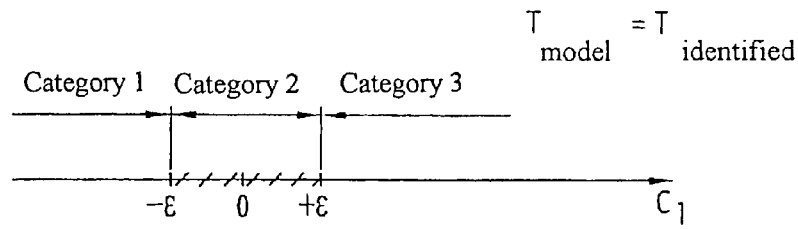
FIG. 7 is a classification graph of two initial braking categories according to the criterion $C_1$, where the modelled delay is equal to the identified delay.
Figure 8:
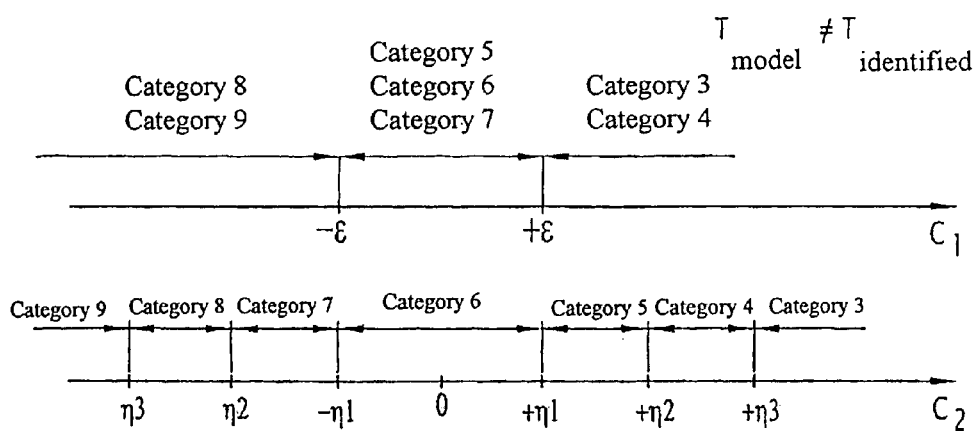
FIG. 8 is a pair of classification graphs of the other categories not shown in FIG. 7 according to the criteria $C_1$ and $C_2$, where the modelled delay is different from the identified model.

FIGS. 7 and 8 show graphs that define the train braking classification process.

As a function of a first classification level based on the difference between the delay of model D and the average identified delay T(Q), one of the following two classifications is used:

i. a classification as a function of the criterion $C_1$ only if the difference is zero (as shown in FIG. 7), ii. a classification as a function of the criteria $C_1$ and $C_2$ taken together, if there is a difference (as shown in FIG. 8).

In the case illustrated in FIG. 7, where the delay of model D is equal to the identified delay T, a threshold value $\epsilon$ allows all the values of $C_1$ to be partitioned into three ranges, the central one being defined by $[-\epsilon, +\epsilon]$ and shown with hatching in FIG. 7.

It is found that if $|C_1| \leq \epsilon$, the train belongs to category 2 and, if not, it belongs to category 1.

If the delay of model D is different from the identified delay T, the classification process described in FIG. 8 is carried out.

In a first stage, using the same threshold value $\epsilon$ as mentioned above, three families of categories are distinguished according to the value of $C_1$, namely:

if $|C_1| \leq \epsilon$, a first family consisting of categories 5, 6 and 7, if the value of $C_1$ is less than $-\epsilon$, a second family consisting of categories 8 and 9, if the value of $C_1$ is greater than $+\epsilon$, a third family consisting of categories 3 and 4.

Next, a more detailed classification of the category level is carried out within the same family, based on the value of $C_2$.

The values of $C_2$ are partitioned according to their position in relation to six threshold values, $\eta 1$, $\eta 2$, $\eta 3$, $-\eta 1$, $-\eta 2$ and $-\eta 3$ with $\eta 1 < \eta 2 < \eta 3$.

Within the first family, if $C_2$ falls within the range $[-\eta 1, +\eta 1]$, the train belongs to category 6, if $C_2$ falls within the range $[+\eta 1, +\eta 2]$, the train belongs to category 5, and if $C_2$ falls within the range $[-\eta 2, -\eta 1]$, the train belongs to category 7.

Within the second family, if $C_2$ falls within the range $[-\eta 3, \eta 2]$, the train belongs to category 8, and if $C_2$ is strictly less than $-\eta 3$, the train belongs to category 9.

Within the third family, if $C_2$ falls within the range $[+\eta 2, +\eta 3]$, the train belongs to category 4, and if $C_2$ is strictly greater than $+\eta 3$, the train belongs to category 3.

The full classification process described above is shown in Table 1.

TABLE 1

| Rule 1 | Selection rule 2 | Selection rule 3 | Category |
|---|---|---|---|
| If T = D | If $|C_1| \leq \epsilon$ | no condition | Category 2 |
|  | If $|C_1| < \epsilon$ | no condition | Category 1 |
| If T ≠ D | If $|C_1| \leq \epsilon$ | If $|C_2| \leq \eta_1$ | Category 6 |
|  |  | If $\eta_1 < C_2 \leq \eta_2$ | Category 5 |
|  |  | If $-\eta_2 \leq C_2 < -\eta_1$ | Category 7 |
|  | If $C_1 < -\epsilon$ | If $-\eta_3 \leq C_2 < -\eta_2$ | Category 8 |
|  |  | If $C_2 < -\eta_3$ | Category 9 |
|  | If C1 > $\epsilon$ | If $\eta_3 \geq c_2 > +\eta_2$ | Category 4 |
|  |  | $C_2 < +\eta_3$ | Category 3 |

Figure 9:
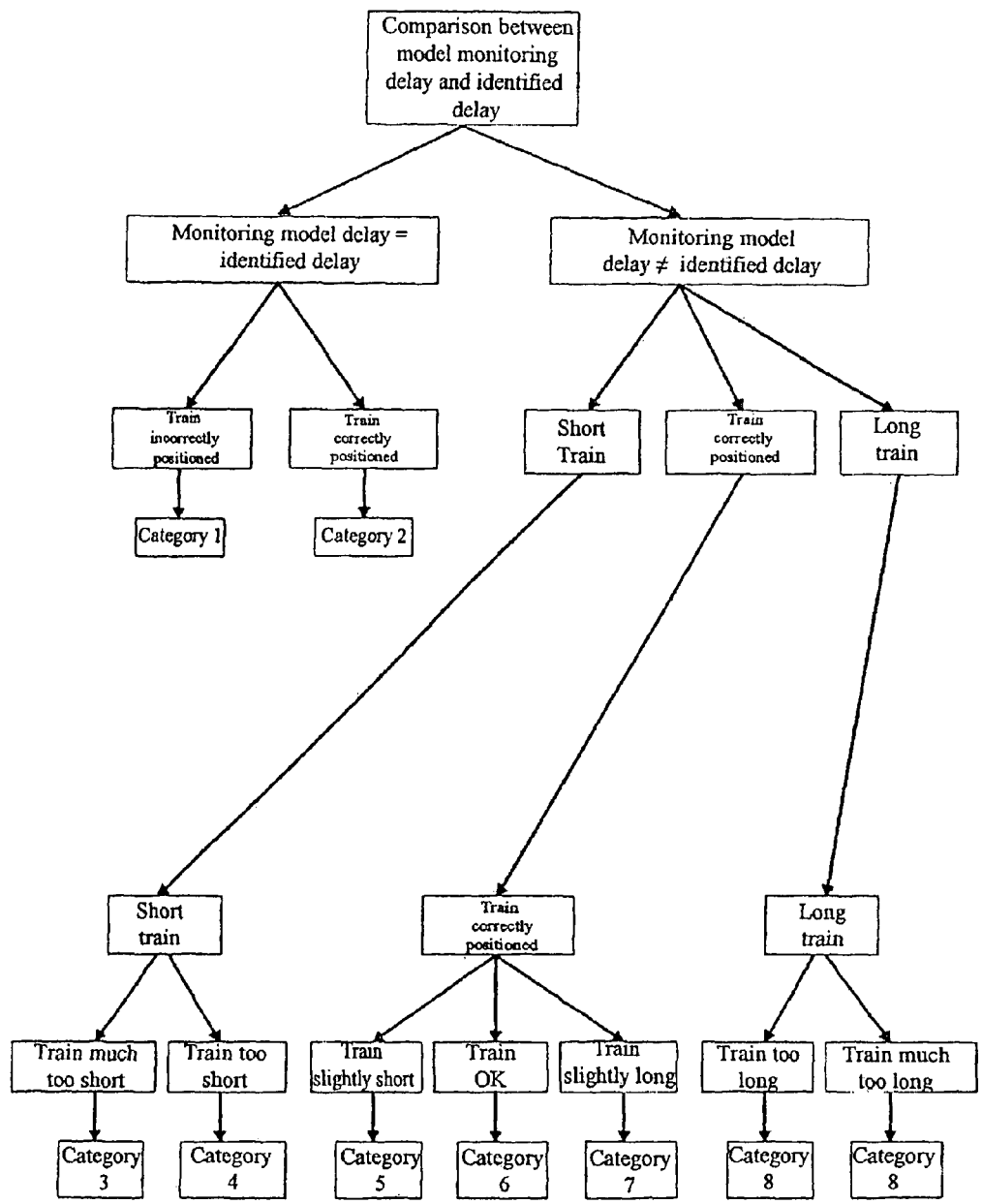
FIG. 9 is a qualitative classification diagram showing the different classification stages according to different identification criteria.

A description of the process for classification into categories, expressed in qualifying terms, is given in FIG. 9. The three classification levels are grouped, the first being that of the delay in the setpoint taking effect, the second being that of the value of the criterion $C_1$ and the third being that of the value of the criterion $C_2$. Here a short train means an overbraking train and a long train means an under-braking train.

As a function of the category to which the train belongs, different controls may be supplied by the control adaptation system. Two types of control are supplied, namely a bias K to be added to the regulation control and a delay shift $\tau$.

Five delay shift states may be supplied, namely lack of shift or shift of zero value, shift of high positive value $+\tau_H$, shift of low positive value $+\Sigma_L$, shift of low negative value $-\tau_L$ and shift of high negative value $-\tau_H$.

Nine bias control values may be supplied for the bias K added to the regulation control, namely a high positive bias value +K3, an intermediate positive bias value +K2, a low positive bias value +K1, a high negative bias value −K3, a low negative bias value −K1, an intermediate negative bias value −K2, a positive bias value specific to category 6 marked $+K_{comb}$, a negative bias value specific to category 6, $-K_{comb}$, and a zero bias value.

Figure 10:
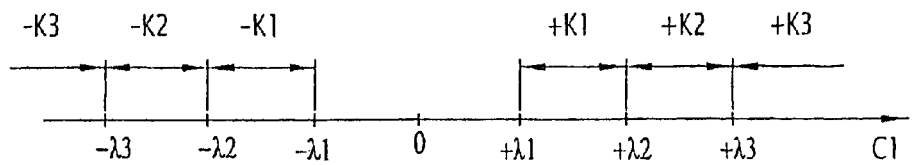
FIG. 10 is a graph for determining the control domains of the control device.

To allocate the controls corresponding to category 1, more precise processing is carried out using the graph shown in FIG. 10.

For category 1, control allocation depends on the value taken by $C_1$ and its position in relation to a set of partitioning values marked $-\lambda 3$, $-\lambda 2$, $-\lambda 1$, $0$, $+\lambda 1$, $+\lambda 2$, $+\lambda 3$ with $\lambda 1 < \lambda 2 < \lambda 3$.

A bias control is allocated as a function of the range to which $C_1$ belongs.

Table 2 shows the above-defined control values allocated to the categories.

TABLE 2

| Category no. | Bias regulator K | Delay adjustment control τ |
| --- | --- | --- |
| Category 1 | if $+\lambda_1 \leq C_1 < +\lambda_2$: +K1 | 0 |
|  | if $+\lambda_2 \leq C_1 < +\lambda_3$: +K2 |  |
|  | if $+\lambda_3 \leq C_1$: +K3 |  |
|  | if $-\lambda_2 < C_1 \leq -\lambda_1$: −K1 |  |
|  | if $-\lambda_3 < C_1 \leq -\lambda_2$: −K2 |  |
|  | if $C_1 \leq -\lambda_3$: −K3 |  |
| Category 2 | 0 | 0 |
| Category 3 | 0 | $+\tau_H$ |
| Category 4 | 0 | $+\tau_L$ |
| Category 5 | 0 | $+\tau_L$ |
| Category 6 | if D − T ≥ 0: $-K_{comb}$ | $-\tau_L$ |
|  | if D − T < 0: $+K_{comb}$ | $+\tau_L$ |
| Category 7 | 0 | $-\tau_L$ |
| Category 8 | 0 | $-\tau_L$ |
| Category 9 | 0 | $-\tau_H$ |

It should be noted that the regulation correction bias control is limited to two delimiters −K3, +K3.

If one of these two delimiters is reached and it has not been possible to adjust the train braking and it remains in a mediocre performance category, a message may be generated stating that the control parameters cannot be adjusted. This may mean that the train cannot be controlled to achieve the desired performance and is outside limits.

Train stopping performance is substantially improved using the adaptation device.

Figure 11:
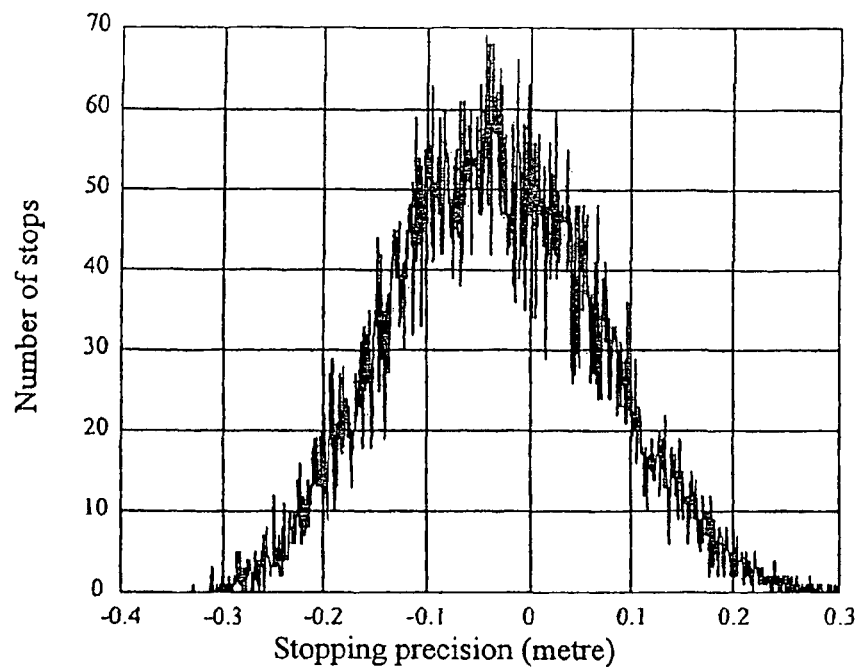
FIG. 11 is a simulated performance graph of the stopping precision of a fleet of trains when the adaptation control unit is inactive.
Figure 12:
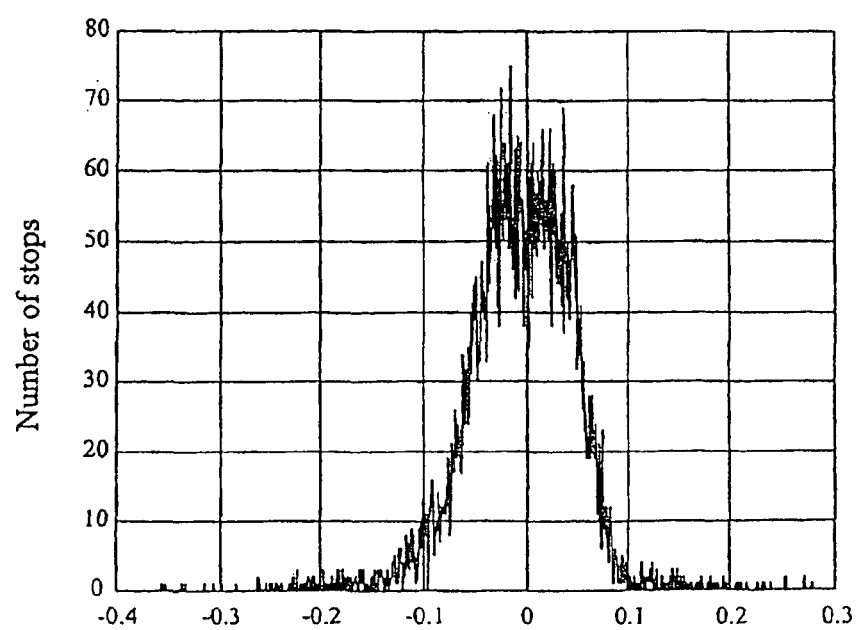
FIG. 12 is a simulated performance graph of the precision-stopping of the trains when the adaptation control unit is active.

FIG. 11 shows simulated stopping details for a fleet of trains sold by Alstom Transport under the trade name "Metropolis" over a set of 15000 stops when the adaptation system is inactive while FIG. 12 shows simulated stopping precision when the adaptation system is active.

Without the adaptation mechanism, the dispersion of stopping precision appears to be about 35 cm, more or less, whereas with the adaptation mechanism, stopping dispersion is about 10 cm, more or less, once the adaptation mechanism is established.

It appears therefore that in a stabilised regime, the stopping dispersion is a third of the dispersion without the adaptation mechanism.

Advantageously, it is not necessary to take remote manual control of trains to align them with the screen doors.

Advantageously, it is not necessary to make provision for frequent maintenance in the workshop to update adjustment of the train stopping control device.

Train availability and traffic are therefore improved.

Advantageously, a tool for evaluating ageing of the stopping control device is supplied for simplification of maintenance tasks, which now consist only of simple module replacements.

Again advantageously, when the train enters service in the network its installation is simplified and no adjustment to the hardware or software by an operator is required.

The invention claimed is:

1. A regulated-control device for precision-stopping of a vehicle with automatic control comprising:
an observed kinematic input configured to or programmed to receive at least an observed kinematic variable for the vehicle,
a predetermined setpoint input, configured to or programmed to receive an unregulated-control setpoint signal,
a regulated-control output configured to or programmed to supply at least a dynamic regulated control value to the vehicle, which is dependent on the observed kinematic input and the setpoint input according to a predetermined characteristic transfer function of the device, the transfer function comprising a dynamic response delay associated with the vehicle as an internal parameter,
an adaptation control unit configured to or programmed to modify the dynamic response delay by an adaptation control, the adaptation control being dependent on the observed kinematic input and the setpoint input; and
wherein the regulated-control device comprises two modifiable internal parameters, the first parameter being the dynamic response delay associated with the vehicle and the second parameter being a dynamic regulation bias control, and the adaptation control unit is configured to modify the dynamic regulation bias control by an adaptation control, the adaptation control being dependent on the observed kinematic input and the setpoint input.

2. The regulated-control device according to claim 1, wherein
the adaptation control is dependent on a difference between, on the one hand, the observed kinematic input, and, on the other hand, an expected kinematic value, determined from a predetermined dynamic response model associated with the vehicle and from the setpoint input.

3. The regulated-control device according to claim 2, wherein the adaptation control also depends on at least a convergence parameter, which is dependent on a regulation control.

4. The regulated-control device according to claim 3, wherein the control function is partitioned into categories defined according to the difference between the observed kinematic input and the expected kinematic value, and the at least one convergence parameter.

5. The regulated-control device according to claim 1, wherein:
the setpoint input is a receiving input for a deceleration setpoint of the vehicle,
the observed kinematic input comprises a receiving input of an observed velocity and a receiving input of an observed deceleration,
the regulated-control output is an output supplying a deceleration regulated-control signal for the vehicle,
and wherein it comprises a set of component units of the transfer function of the device.

6. The regulated-control device according to claim 5, wherein the regulated-control device comprises:

a modelling unit representing an expected dynamic response of the vehicle to the deceleration setpoint and allowing the expected deceleration of the vehicle to be determined as an expected kinematic value, a unit for comparing the expected deceleration signal with the observed deceleration signal, a regulation unit for providing a feedback control signal for correcting the difference between the expected deceleration and the observed deceleration, a synthesis unit to determine a regulated-control signal as a function of the setpoint signal and the feedback correction signal.

7. The regulated-control device according to claim 1, wherein the adaptation control unit comprises:

a first input of an adaptation control unit for receiving the deceleration setpoint, a second adaptation control input for receiving the observed deceleration, a response time estimator by comparing the time variation curve of the expected deceleration with that of the observed deceleration, at least a convergence parameter statistical estimator representing the stopping precision, which is dependent on the observed deceleration of the vehicle and the train deceleration setpoint.

8. The regulated-control device according to claim 6, wherein the regulation unit comprises a regulation unit input for receiving the difference between the expected deceleration and the observed deceleration, an output supplying an integral-type regulation component known as an integral control, and wherein the adaptation unit comprises a third input connected to the integral control output of the regulation unit.

9. The regulated-control device according to claim 7, wherein at least an estimator of the adaptation unit is configured to or programmed to determine a convergence criterion based on the integral regulation control signal supplied at input.

10. The regulated-control device according to claim 1, wherein the control adaptation unit is configured to or programmed to:

identifying, by a classification process, a braking category of a vehicle which is dependent, on the one hand, on the difference between an observed response time and a time predicted by the modelling unit of the effect of the setpoint sent to the vehicle and on the other hand on at least a convergence parameter, and allocating adaptation controls as a function of the braking category of the vehicle.

11. The regulated-control device according to claim 5, wherein the adaptation control unit comprises:

an input supplying an observed velocity of the train, a first statistical estimator of a first convergence parameter representing the stopping performance, which is dependent on the observed deceleration and the deceleration setpoint, a second statistical estimator of a second convergence parameter representing the stopping performance which is dependent on the observed velocity, the observed deceleration and the deceleration setpoint.

12. The regulated-control device according to claim 1, wherein the adaptation control unit comprises:

a first output configured to or programmed to issue a bias control for regulating the control, and a second output configured to or programmed to issue a control for adjusting the dynamic response delay.

13. The regulated-control device according to claim 12 wherein the first output of the adaptation control unit is connected to the input of the regulation unit, and the second output of the adaptation unit is connected to the input of the modelling unit to supply it with a delay adjustment control.

14. The regulated-control device according to claim 1, wherein the regulated-control device comprises:

a triggering/activation input for the stopping control device, and triggering/activation means for operating the stopping control device.

15. The regulated-control device according to claim 14, wherein the triggering/activation device comprises:

a control input configured to or programmed to receive an activation control input of the final precision-stopping mode, a switch with two inputs and a single output, the output being connected directly to the input of the vehicle, and wherein the connection of an input to the output depends on the triggering/activation control signal supplied at control input.

16. A regulated-control process for precision vehicle stopping used by a regulated-control device defined by a transfer function having a dynamic response delay associated with the vehicle as an internal parameter, comprising:

receiving, at a setpoint input, a predetermined unregulated-control setpoint for the vehicle, receiving, at an observed kinematic input, an observed kinematic value from the vehicle, supplying, at a regulated-control output, an adjusted control signal to the vehicle, controlling, using an adaptation unit, an adaptation of the dynamic response delay as a function of the setpoint input and the observed kinematic input, and wherein the regulated-control process comprises:

modelling and calculating a dynamic response of the vehicle to a vehicle control setpoint in the form of an expected kinematic value, comparing the expected kinematic value with the observed deceleration value, regulating the control setpoint by supplying a feedback signal to correct the difference between the expected kinematic value and the observed kinematic value, combining the setpoint and the feedback correction signal to determine a regulated-control.

17. The regulated-control process according to claim 16, wherein the adaptation control stage comprises:

receiving the control setpoint at a first input, receiving the observed kinematic value at a second input, estimating the dynamic response time by comparing the time variation of the expected kinematic value with the observed kinematic value, estimating by a statistic a convergence parameter representing the stopping precision, as a function of the observed kinematic value and the control setpoint.

18. The regulated-control process according to claim 16, wherein the adaptation control stage comprises:

receiving an integral-type regulation component supplied at the regulation stage, and wherein the estimation of a convergence criterion is based on the integral-type regulation component supplied.

19. The regulated-control process according to claim 16, wherein the adaptation control stage also comprises:

identifying by a classification process a braking category for a train, which is dependent, on the one hand, on the difference between the observed response time and the predicted time of effect of the setpoint sent to the vehicle via the control device and on the other hand on at least a convergence parameter representing a stop, and allocating adaptation controls, which are dependent on the braking category of the train.

20. The regulated-control process according to claim 17, wherein the adaptation control stage also comprises:
receiving an observed velocity of the vehicle at an input, and the estimation stage comprises
a first estimation stage including determining, by a first statistic, a first convergence parameter representing the adjustment performance, which is dependent on the observed deceleration of the train and the deceleration setpoint,
a second estimation stage by a second statistic of a second convergence parameter representing the adjustment performance, which is dependent on the observed velocity, the observed deceleration and the deceleration setpoint.

21. The regulated-control process according to claim 16, wherein the adaptation control stage also comprises:

issuing at an initial output a bias control for regulating the regulated control, and issuing at a second output a delay adjustment control.

22. The regulated-control process according to claim 21, wherein:

the delay adjustment control is supplied to the unit for modelling the dynamic response of the vehicle.

23. The regulated-control process according to claim 17, wherein the adaptation control stage also comprises:

supplying an outside-limits train warning message if the convergence criteria fail to converge and/or there is failure of alignment of the response time the taking effect of the deceleration setpoint after a predetermined number of stops.

24. The regulated-control process according to claim 16, wherein the regulated-control process also comprises:

triggering/activating the regulated-control device.

25. A vehicle with a traction engine and a brake comprising a regulated-control device for precision-stopping according to claim 1 to control the action of the motor and/or the brake.

* * * * *